US009934886B1

(12) United States Patent
Zeng et al.

(10) Patent No.: US 9,934,886 B1
(45) Date of Patent: Apr. 3, 2018

(54) STABLE AND EASY-TO-INSTALL AND REMOVE MULTI-CONDUCTIVE CORE CABLE AND PROCESSING METHOD THEREOF

(71) Applicant: Chongqing Yufeng Xinxin Wire & Cable Technology Co., Ltd., Chongqing (CN)

(72) Inventors: Lingguo Zeng, Chongqing (CN); Zhijun Li, Chongqing (CN)

(73) Assignee: Chongqing Yufeng Xinxin Wire & Cable Technology Co., Ltd., Chongqing (CN)

( * ) Notice: Subject to any disclaimer, the term of this patent is extended or adjusted under 35 U.S.C. 154(b) by 0 days.

(21) Appl. No.: 15/801,303

(22) Filed: Nov. 1, 2017

(30) Foreign Application Priority Data

Jun. 30, 2017 (CN) .......................... 2017 1 0519951

(51) Int. Cl.
*H01B 7/02* (2006.01)
*H01B 13/10* (2006.01)
(Continued)

(52) U.S. Cl.
CPC ......... *H01B 7/0225* (2013.01); *H01B 7/2825* (2013.01); *H01B 13/0036* (2013.01);
(Continued)

(58) Field of Classification Search
CPC .... H01B 7/0225; H01B 7/185; H01B 11/002; H01B 11/02; H01B 11/04
See application file for complete search history.

(56) References Cited

U.S. PATENT DOCUMENTS 5,902,958 A * 5/1999 Haxton ................ H01B 7/0072
138/110
9,629,289 B2 * 4/2017 Ohkubo ............... H01B 7/0045
(Continued)

*Primary Examiner* — Hoa C Nguyen
*Assistant Examiner* — Amol Patel
(74) *Attorney, Agent, or Firm* — Galvin Patent Law LLC; Brian R. Galvin

(57) ABSTRACT

The present invention discloses a stable and easy-to-install and remove multi-conductive core cable, an outer protective layer and cable inner core wires arranged in an inner cavity of the outer protective layer. The present invention also discloses a method for processing a stable and easy-to-install and remove multi-conductive core cable, and the method comprises the following steps: S1: preparing a traction rope, an outer protective layer of a cable to be threaded and cable inner core wires; S2: fixedly fastening one end of the traction rope to one end of the cable inner core wires, and threading the end with a hook of the traction rope out through an inner cavity of the outer protective layer; S3: fixing the hook by a wire drawing machine or a traction device and performing traction operation on the cable inner core wires; and S4: controlling an traction rate at not more than 3 m/min until end of the threading of the cable inner core wire. A runner mounting groove and an auxiliary runner device are arranged in the inner cavity of the outer protective layer of the cable, so that the cable threading process is facilitated, structural integrity is ensured, and such arrangement is applicable to design of short cables, and security is high and will not be affected after maintenance.

7 Claims, 2 Drawing Sheets

(51) Int. Cl.
  *H01B 13/00* (2006.01)
  *H01B 13/32* (2006.01)
  *H01B 7/282* (2006.01)
  *H01B 13/26* (2006.01)

(52) U.S. Cl.
  CPC ......... *H01B 13/10* (2013.01); *H01B 13/2613* (2013.01); *H01B 13/32* (2013.01)

(56) References Cited

U.S. PATENT DOCUMENTS

| | | | |
|---|---|---|---|
| 2003/0037955 A1* | 2/2003 | Glew | G02B 6/4435 174/99 R |
| 2013/0248218 A1* | 9/2013 | Glew | H05K 9/0098 174/34 |
| 2017/0271049 A1* | 9/2017 | Wehrli | H01B 11/1008 |
| 2017/0358385 A1* | 12/2017 | Varkey | H01B 9/005 |

* cited by examiner

STABLE AND EASY-TO-INSTALL AND REMOVE MULTI-CONDUCTIVE CORE CABLE AND PROCESSING METHOD THEREOF

CROSS-REFERENCE TO RELATED APPLICATIONS

This application claims priority to Chinese patent application 201710519951.3 titled "Stable and Easy-to-install and Remove Multi-conductive Core Cable and Processing Method Thereof", filed on Jun. 30, 2017, the entire specification of which is hereby incorporated by reference in its entirety.

FIELD OF THE INVENTION

The present invention relates to the field of cable products, in particular to a stable and easy-to-install and remove multi-conductive core cable and manufacturing method thereof.

DESCRIPTION OF THE RELATED ART

It is laborious and time consuming in traction production, and the present invention is proposed in order to solve such problem.

SUMMARY OF THE INVENTION

A purpose of the present invention is to provide a stable and easy-to-install and remove multi-conductive core cable and a manufacturing method thereof to solve the problems in the prior art.

To achieve the purpose, the present invention provides a technical solution as follows: a stable and easy-to-install and remove multi-conductive core cable, comprising a multi-conductive core cable body, the multi-conductive core cable body being provided with not less than three groups of single-conductive core cables at the center, wherein each group of the single-conductive core cable is arranged on a filling structure, and an outer layer edge wrap of the filling structure is provided with a bedding layer, an outermost layer of the multi-conductive core cable body is a protective layer, two armouring layers are arranged between the bedding layer at an outer layer of the filling structure and the protective layer, and a bedding layer is arranged between the two armouring layers;

the filling structure is provided with not less than three groups of single cable wrapping cavities, a symmetrically arranged elastic block is formed between each two groups of single cable wrapping cavities, and an arc-shaped reinforcement is arranged between the two groups of elastic blocks, the arc-shaped reinforcement is a cavity-like structure with an arc-shaped support cavity, and the center of the arc-shaped support cavity is provided with a spring to extrude the elastic block; and outermost edges of the arc-shaped support cavity and the single cable wrapping cavity on the filling structure are provided with openings respectively, and the opening on the elastic block close to the arc-shaped support cavity is provided with a traction device support and extrusion buckle.

Preferably, the single cable conductive core comprises a conductor inner core arranged at the center, a semi-conductive layer arranged along an outer layer of the conductor inner core, an insulator arranged at the outer edge of the semi-conductive layer, a shielding layer arranged on an outer layer of the insulator, and a watertight layer arranged on an outer layer of the shielding layer.

Preferably, each group of the single cable conductive cores is arranged in the corresponding single cable wrapping cavity.

Preferably, the filling structure is an insulated and waterproof soft rubber structure, and the spring on the filling structure is a soft elastic rubber spring.

Preferably, the multi-conductive core cable body is a layer-by-layer wrapped structure.

Preferably, a diameter of the opening of the arc-shaped support cavity located at the edge of the filling structure is larger than the diameter of an end close to the center of the filling structure.

A method for processing a stable and easy-to-install and remove multi-conductive core cable, a threading process thereof comprising the following steps:

S1: preparing structures for the cable, comprising a, a protective layer, armouring, bedding layers, conductor inner cores, a semi-conductive layer, an insulator, shielding layers and a watertight layer which are required for multi-conductive core cable body and are all manufactured by corresponding processes;

S2: manufacturing a filling structure required for the cable by pulling-over and rubber adhesive brushing—inserting into an mold—injection of rubber adhesive—vulcanization—mold stripping—delasting;

S3: threading the single cable, formed by nesting the conductor inner cores, the semi-conductive layer, the insulator, the shielding layers and the watertight layer into a single cable wrapping cavity of the filling structure; and S4: wiring the cable body by successively wrapping up the outer layer of the filling structure obtained from the step S3 with the bedding layer, the armouring, the bedding layer, the armouring, and the protective layer.

Compared with the prior art, the invention has the following beneficial effects:

1. the filling structure is arranged as a cavity-like structure with an arc-shaped reinforcement, which can effectively reduce the space occupied by the filling structure, reduce the weight of the cable, save the cost, and facilitate transport;

2. the spring is arranged in the arc-shaped support cavity of the arc-shaped reinforcement, which can ensure that a single cable is well clamped when arranged in the single cable wrapping cavity of the filling structure;

3. the traction device support and extrusion buckle is arranged on the elastic block of the filling structure, which can expand the opening of the single cable wrapping cavity to facilitate cable traction; and 4. the design of the filling structure reduces the cable processing procedures, simplifies the processing steps, and reduces time and cost compared with the traditional processing and post-processing.

Figure 1:
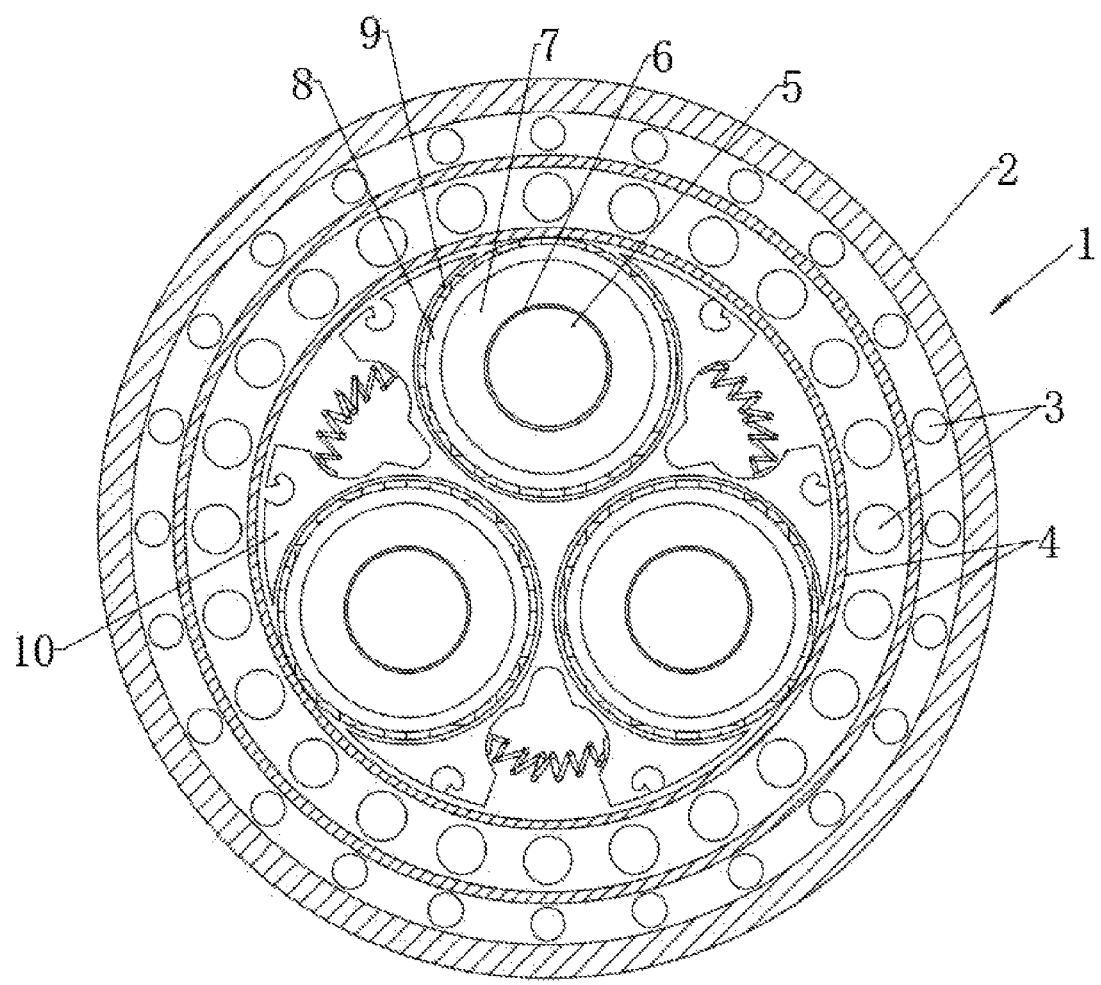
FIG. 1 is a structural diagram of the invention.
Figure 2:
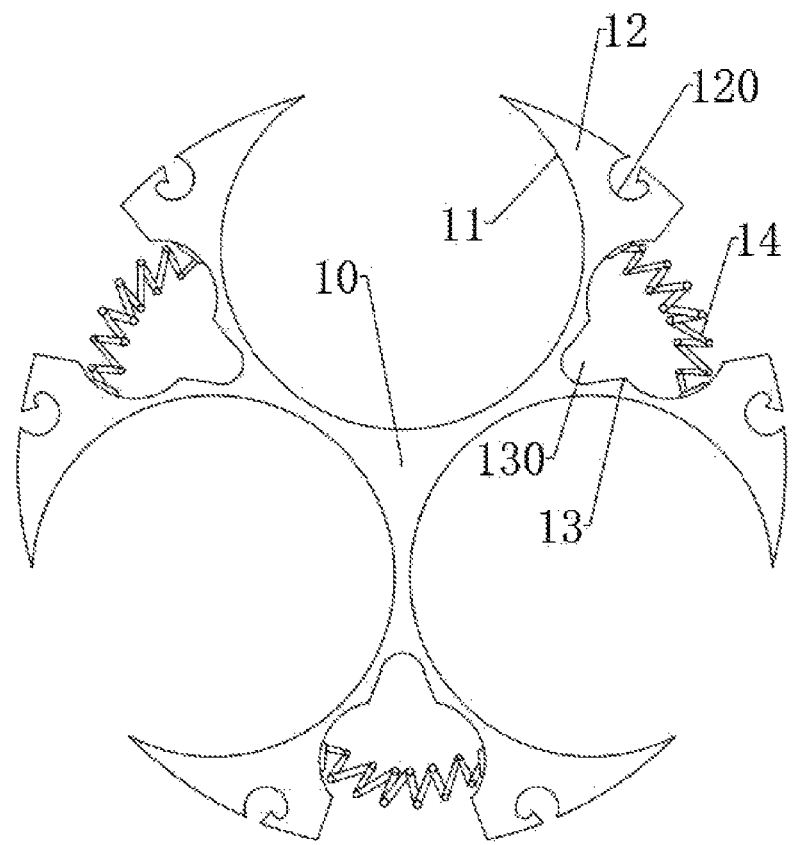
FIG. 2 is a structural diagram of the filling structure of the invention.
Figure 3:
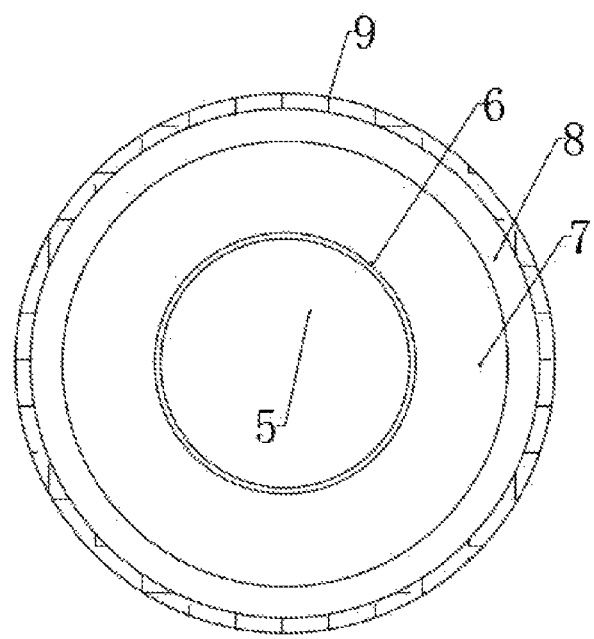
FIG. 3 is a structural diagram of the single cable of the invention.

In the figures, 1 multi-conductive core cable body, 2 protective layer, 3 armouring, 4 bedding layer, 5 conductor inner core, 6 semi-conductive layer, 7 insulator, 8 shielding layer, 9 watertight layer, 10 filling structure, 11 single cable wrapping cavity, 12 elastic block, 120 traction device support and extrusion buckle, 13 arc-shaped reinforcement, 13 arc-shaped support cavity, and 14 spring.

DESCRIPTION OF THE PREFERRED EMBODIMENT

The technical solution in the embodiments of the present invention will be described clearly and completely as follows. Apparently, the embodiments described are only some embodiments of the present invention, but not all embodiments. Based on the embodiments of the present invention, all other embodiments obtained by those of ordinary skill in the art without making creative work are within the protection scope of the present invention.

The invention provides a technical solution, and the technical solution of the invention will be further described in detail with reference to embodiments.

A stable and easy-to-install and remove multi-conductive core cable, comprising a multi-conductive core cable body (1), the multi-conductive core cable body (1) being provided with not less than three groups of single-conductive core cables at the center, wherein each group of the single-conductive core cable is arranged on a filling structure (10), and an outer layer edge wrap of the filling structure (10) is provided with a bedding layer (4), an outermost layer of the multi-conductive core cable body (1) is a protective layer (2), two armouring layers (3) are arranged between the bedding layer (4) at an outer layer of the filling structure (10) and the protective layer (2), and a bedding layer (4) is arranged between the two armouring layers (3);

the filling structure (10) is provided with not less than three groups of single cable wrapping cavities (11), a symmetrically arranged elastic block (12) is formed between each two groups of single cable wrapping cavities (11), and an arc-shaped reinforcement (13) is arranged between the two groups of elastic blocks (12), the arc-shaped reinforcement (13) is a cavity-like structure with an arc-shaped support cavity (130), and the center of the arc-shaped support cavity (130) is provided with a spring (14) to extrude the elastic block (12); and outermost edges of the arc-shaped support cavity (130) and the single cable wrapping cavity (11) on the filling structure (10) are provided with openings respectively, and the opening on the elastic block (12) close to the arc-shaped support cavity (130) is provided with a traction device support and extrusion buckle (120).

The single cable conductive core comprises a conductor inner core (5) arranged at the center, a semi-conductive layer (6) arranged along an outer layer of the conductor inner core (5), an insulator (7) arranged at the outer edge of the semi-conductive layer (6), a shielding layer (8) arranged on an outer layer of the insulator (7), and a watertight layer (9) arranged on an outer layer of the shielding layer (8);

each group of the single cable conductive cores is arranged in the corresponding single cable wrapping cavity (11);

the filling structure (10) is an insulated and waterproof soft rubber structure, and the spring (14) on the filling structure (10) is a soft elastic rubber spring;

the multi-conductive core cable body (1) is a layer-by-layer wrapped structure;

a diameter of the opening of the arc-shaped support cavity (130) located at the edge of the filling structure (10) is larger than the diameter of an end close to the center of the filling structure (10).

A method for processing a stable and easy-to-install and remove multi-conductive core cable, a threading process thereof comprising the following steps:

S1: preparing structures for the cable, comprising a, a protective layer (2), armouring (3), beddings (4), conductor inner cores (5), a semi-conductive layer (6), a insulator (7), shielding layers (8) and a watertight layer (9) which are required for multi-conductive core cable body (1) and are all manufactured by corresponding processes;

S2: manufacturing a filling structure (10) required for the cable by pulling-over and rubber adhesive brushing—inserting into an mold—injection of rubber adhesive—vulcanization—mold stripping—delasting;

S3: threading the single cable, formed by nesting the conductor inner cores (5), the semi-conductive layer (6), the insulator (7), the shielding layers (8) and the watertight layer (9) into a single cable wrapping cavity (11) of the filling structure (10); and S4: wiring the cable body by successively wrapping up the outer layer of the filling structure (10) obtained from the step S3 with a bedding layer (4), an armouring (3), a bedding layer (4), an armouring (3), and the protective layer (2).

In actual maintenance, caps at both ends of the cable are unscrewed, and the outer protective layer (1) of the cable is separated from the cable inner core wires (5) by the same method as threading.

The filling structure (10) is arranged as a cavity-like structure with an arc-shaped reinforcement (13), which can effectively reduce the space occupied by the filling structure, reduce the weight of the cable, save the cost, and facilitate transport; the spring is arranged in the arc-shaped support cavity (130) of the arc-shaped reinforcement (13), which can ensure that a single cable is well clamped when arranged in the single cable wrapping cavity of the filling structure (10); the traction device support and extrusion buckle (120) is arranged on the elastic block (12) of the filling structure (10), which can expand the opening of the single cable cavity (11) to facilitate cable traction; and the design of the filling structure (10) reduces the cable processing procedures, simplifies the processing steps, and reduces time and cost compared with the traditional processing and post-processing.

Although several embodiments of the invention have been showed and described, those of ordinary skill in the art should understand that they can make various changes, modifications, replacements and alterations to these embodiments without departing from the spirit and essence of the invention. The protection scope of the invention is defined by the appended claims and equivalent.

The invention claimed is:

1. A stable and easy-to-install and remove multi-conductive core cable, comprising a multi-conductive core cable body (1), the multi-conductive core cable body (1) being provided with not less than three groups of single-conductive core cables at the center, characterized in that each group of the single-conductive core cable is arranged on a filling structure (10), and an outer layer edge wrap of the filling structure (10) is provided with a bedding layer (4), an outermost layer of the multi-conductive core cable body (1) is a protective layer (2), two armouring layers (3) are arranged between the bedding layer (4) at an outer layer of the filling structure (10) and the protective layer (2), and a bedding layer (4) is arranged between the two armouring layers (3);

the filling structure (10) is provided with not less than three groups of single cable wrapping cavities (11), a symmetrically arranged elastic block (12) is formed between each two groups of single cable wrapping cavities (11), and an arc-shaped reinforcement (13) is arranged between the two groups of elastic blocks (12), the arc-shaped reinforcement (13) is a cavity-like structure with an arc-shaped support cavity (130), and the center of the arc-shaped support cavity (130) is provided with a spring (14) to extrude the elastic block (12); and outermost edges of the arc-shaped support cavity (130) and the single cable wrapping cavity (11) on the filling structure (10) are provided with openings respectively, and the opening on the elastic block (12) close to the arc-shaped support cavity (130) is provided with a traction device support and extrusion buckle (120).

2. The stable and easy-to-install and remove multi-conductive core cable according to claim 1, characterized in that the single cable conductive core comprises a conductor inner core (5) arranged at the center, a semi-conductive layer (6) arranged along an outer layer of the conductor inner core (5), an insulator (7) arranged at the outer edge of the semi-conductive layer (6), a shielding layer (8) arranged on an outer layer of the insulator (7), and a watertight layer (9) arranged on an outer layer of the shielding layer (8).

3. The stable and easy-to-install and remove multi-conductive core cable according to claim 2, characterized in that each group of the single cable conductive cores is arranged in the corresponding single cable wrapping cavity (11).

4. The stable and easy-to-install and remove multi-conductive core cable according to claim 1, characterized in that the filling structure (10) is an insulated and waterproof soft rubber structure, and the spring (14) on the filling structure (10) is an soft elastic rubber spring.

5. The stable and easy-to-install and remove multi-conductive core cable according to claim 1, characterized in that the multi-conductive core cable body (1) is a layer-by-layer wrapped structure.

6. The stable and easy-to-install and remove multi-conductive core cable according to claim 1, characterized in that a diameter of the opening of the arc-shaped support cavity (130) located at the edge of the filling structure (10) is larger than the diameter of an end close to the center of the filling structure (10).

7. A method for processing a stable and easy-to-install and remove multi-conductive core as in one of claims 1-6, characterized in that the method comprises the following steps:

S1: preparing structures for the cable, comprising a, a protective layer (2), armouring (3), bedding layers (4), conductor inner cores (5), a semi-conductive layer (6), an insulator (7), shielding layers (8) and a watertight layer (9) which are required for multi-conductive core cable body (1) and are all manufactured by corresponding processes;

S2: manufacturing a filling structure (10) required for the cable by pulling-over and rubber adhesive brushing—inserting into an mold—injection of rubber adhesive—vulcanization—mold stripping—delasting;

S3: threading the single cable, formed by nesting the conductor inner cores (5), the semi-conductive layer (6), the insulator (7), the shielding layers (8) and the watertight layer (9) into a single cable wrapping cavity (11) of the filling structure (10); and S4: wiring the cable body by successively wrapping up the outer layer of the filling structure (10) obtained from the step S3 with the bedding layer (4), the armouring (3), the bedding layer (4), the armouring (3), and the protective layer (2).

\* \* \* \* \*